United States Patent [19]

Ono

[11] Patent Number: 4,970,362
[45] Date of Patent: Nov. 13, 1990

[54] WIRE-CUTTING ELECTRIC DISCHARGE MACHINING DEVICE

[75] Inventor: Yasunori Ono, Hatano, Japan

[73] Assignee: Amada Company, Limited, Japan

[21] Appl. No.: 184,428

[22] Filed: Apr. 21, 1988

[30] Foreign Application Priority Data

Apr. 22, 1987 [JP] Japan .................................. 62-097540

[51] Int. Cl.[5] ......................... B23H 7/02; B23H 7/06; B23H 7/20
[52] U.S. Cl. ............................... 219/69.12; 219/69.17
[58] Field of Search .............. 219/69 W, 69 M, 69 G, 219/69 C, 69.12, 69.17, 69.16, ; 204/206, 224 M; 324/71.2, 122

[56] References Cited

U.S. PATENT DOCUMENTS

| 4,324,970 | 4/1982 | Nanasawa et al. | 219/69 W |
| 4,521,662 | 6/1985 | Kinoshita et al. | 219/69.12 |
| 4,546,227 | 10/1985 | Gamo et al. | 219/69.12 |
| 4,622,450 | 11/1986 | Kinoshita et al. | 219/69.12 |
| 4,649,252 | 3/1987 | Obara | 219/69 C |
| 4,654,497 | 3/1987 | Obara | 219/69 C |
| 4,673,787 | 6/1987 | Inoue | 219/69 W |

FOREIGN PATENT DOCUMENTS

| 38658 | 10/1981 | European Pat. Off. | 219/69 G |
| 0038658 | 10/1981 | European Pat. Off. | |
| 067229 | 12/1982 | European Pat. Off. | |
| 0067229 | 12/1982 | European Pat. Off. | |
| 1361232 | 7/1974 | United Kingdom | |
| 2015780A | 9/1979 | United Kingdom | |

OTHER PUBLICATIONS

Patent Abstracts of Japan: vol. 4, No. 41 (M-5) 523 29 Mar 1980 Citing JP-A-55 11761, Mitsubishi, Denki kk Primary Examiner—A. D. Pellinen
Assistant Examiner—Geoffrey S. Evans
Attorney, Agent, or Firm—Wigman & Cohen

[57] ABSTRACT

A wire-cutting electric discharge machining device comprises a process precision detection device. The process precision detection device detects process error by measuring spacings between the wire electrode, which will be moved along a predetermined measurement path, and a processed edge of the workpiece, in which the measurement path is set substantially a parallel to a processed edge of the product. The process precision detection device measures the spacing between the wire electrode and the processed edge of the product by moving the wire electrode from a measurement point on the measurement path to the edge of the product while detecting electrical voltage between the wire electrode and the product.

16 Claims, 5 Drawing Sheets

WIRE-CUTTING ELECTRIC DISCHARGE MACHINING DEVICE

BACKGROUND OF THE INVENTION

1. Field of the invention

The present invention relates to a wire-cutting electrical discharge machining device.

2. Description of the Related Art

In recent years, with the requirements for higher precision metal processing there has been a demand for a wire-cutting electric discharge machining device capable of performing EDM with high processing precision. Accordingly, in order to satisfy the market demand for high precision, manufacturing companies have developed a power source in which the energy output is precisely controlled for this type of processing and multi-processing software to carry out the rough, intermediate, and finishing processes in a stepwise manner.

However, the major drawback to wire-cutting electric discharge devices is that minute changes occur during processing as a result of fluctuations in the power source, the presence of chips removed during the procession of a workpiece, vibrations in the wire electrodes, process configurations, and the like, so that the machining precision during processing is not stable.

Accordingly, there are conventional examples where, in order to obtain highly precise processing, the workpiece is removed from the process table after processing, an inspection is carried out to evaluate the processing precision, and the workpiece is remounted on the process table so that modifications or finishing can be performed.

However, with conventional methods such as those outlined above, it is difficult to remount the workpiece once it has been removed from the process table. This remounting operation also requires considerable time and can give rise to remounting errors, thus leading to additional difficulties in producing satisfactory goods.

SUMMARY OF THE INVENTION

An object of the present invention is to provide, with due consideration to the drawbacks of such conventional devices, a wire-cutting electric discharge machining device, the use of which allows the inspection of the processing precision to be easily and quickly performed without the necessity of removing the workpiece from the process table, and which is capable of performing highly precise electric discharge in processing.

This object of the present invention is accomplished by the provision of a wire-cutting electric discharge device comprising a process precision detection device which, after completion of the rough processing or the finishing processing, measures the spacing between the wire electrode and the workpiece from the action of the wire electrode moving substantially parallel to the shape of the product and thus detects any errors in the electric discharge process from differences in the measured spacing.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
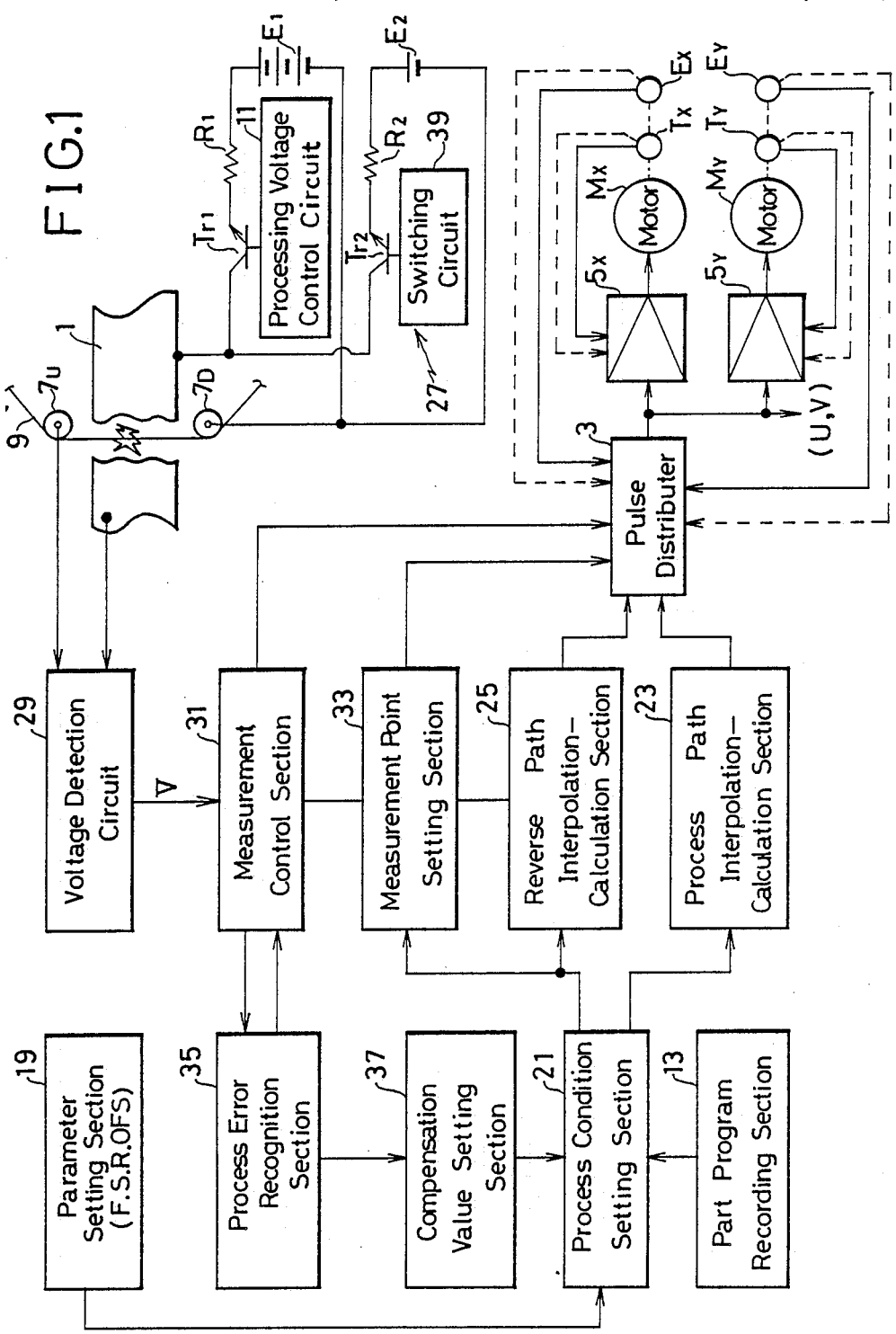
FIG. 1 is a block diagram of a first embodiment of the wire-cutting electric discharge device of the present invention.
Figure 2:
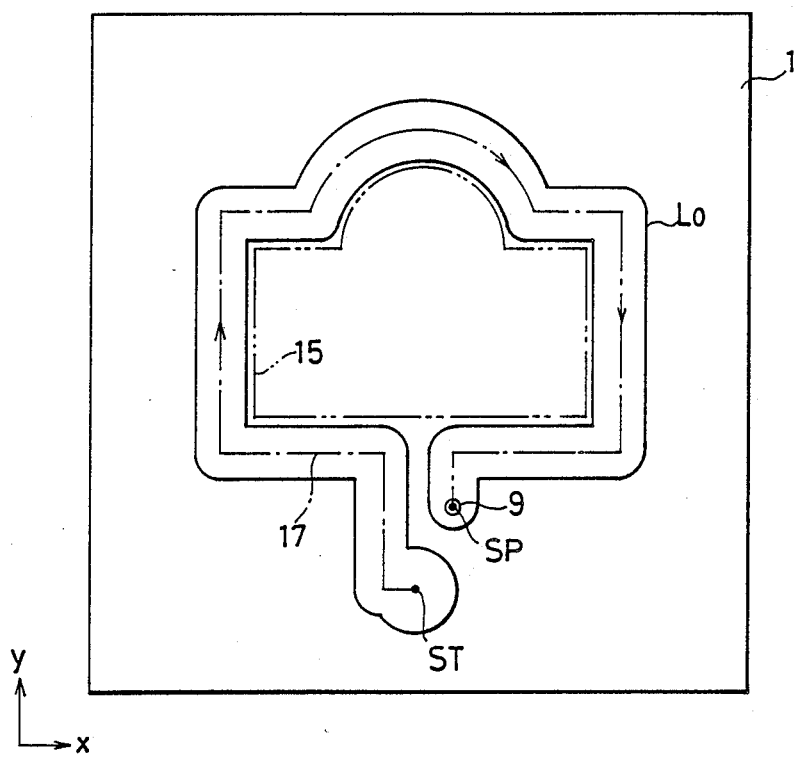
FIG. 2 is an explanatory diagram of the process path.

Now referring to the drawings, FIG. 1 is a block diagram of a first embodiment of the wire-cutting electric discharge device of the present invention. FIG. 2 is an explanatory diagram of the process path.

First, the mechanical system of the equipment will be explained. A processing table (not shown in the drawings) to which a workpiece 1 is secured is moved on a plane, defined by the surface thereof, by means of a pair of servomotors Mx, My.

In order to move the processing table, a distributed pulse, which corresponds to the direction of the movement of the process table on the X-Y surface, is output from a pulse distributor 3, and a pair of amplifiers 5X and 5Y respectively amplify the distributed pulse.

The servomotors Mx, My are driven by the amplified voltages output from the amplifiers 5X, 5Y. The operation of the servomotors Mx, My is detected by a pair of tachogenerators Tx, Ty and a pair of encoders Ex, Ey, and the detected results are respectively fed back to the pulse distributor 3 and the amplifiers 5X, 5Y. A servo system (U, V) is connected to the pulse distributor 3 in order to cause a wire electrode 9 to incline by a certain angle against the workpiece 1.

The wire electrode 9 is mounted on a pair of rollers 7U, 7D, which are arranged vertically to each other, so that it travels in the vertical direction through a gap in the workpiece. A DC circuit including a transistor $Tr_1$ used as a switch, a resistance $R_1$, and a power source $E_1$ is connected between the roller 7D and the workpiece 1. A processing voltage control circuit 11 for switching on and off a processing voltage is connected to the base of the transistor $Tr_1$ the processing voltage being applied in pulse form between the workpiece 1 and the wire electrode 9.

In the above-mentioned configuration it is possible to machine the workpiece 1 into a specified form by the electric discharge process performed by moving the workpiece 1 in a horizontal plane with respect to the wire electrode 9 which is located in one position on the horizontal plane. The relationship between the workpiece 1 and the wire electrode 9 is such that, in the following, it is assumed that the workpiece is fixed, and the wire electrode 9 is caused to move on the plane surface XY which will be defined on the process table, so that the electric discharge process is carried out to provide the specified shape for the workpiece 1.

Next, the control system will be explained. A part program recording section 13 records a program which specifies the elementary shape of a product 15 to be formed by electric discharge processing of the workpiece 1, as shown in FIG. 2.

A parameter setting section 19 provides signals for setting parameters such as the process speed F, the scaling parameter S, the pattern rotation parameter R, the offset value of the wire electrode 9 with respect to the product shape OFS, and the like.

A process condition setting section 21 determines the process conditions such as process speed, the process path through which the wire electrode passes the electric discharge, and the like by applying the parameters provided from the parameter setting section 19 to the product shape specified by the part program recorded in the part program recording section. A process path interpolation-calculation section 23 divides a process path 17, which is set by the process condition setting section 21, into segment units such as a straight line portion, an arc portion, and the like, and successively performs interpolation-calculations from a starting position ST to a terminating position SP (FIG. 2).

A reverse path interpolation-calculation section 25 successively performs interpolation-calculations from the terminating position SP to the starting position ST, the calculations comprising calculation steps (the order of which is reverse to that performed in the process path interpolation-calculation section 23) to move the wire electrode 9 on a reverse path, as shown in FIG. 2.

In operation, the pulse signal is output from the pulse distributor 3 so that the processing table is caused to move along the predetermined process path, maintaining the offset prescribed for the product shape specified by the part program. Due to the prescribed movement of the processing table, as shown in FIG. 2, the wire electrode 9 is moved along the process path 17 and processing is carried out along a processing curve $L_0$.

Figure 3:
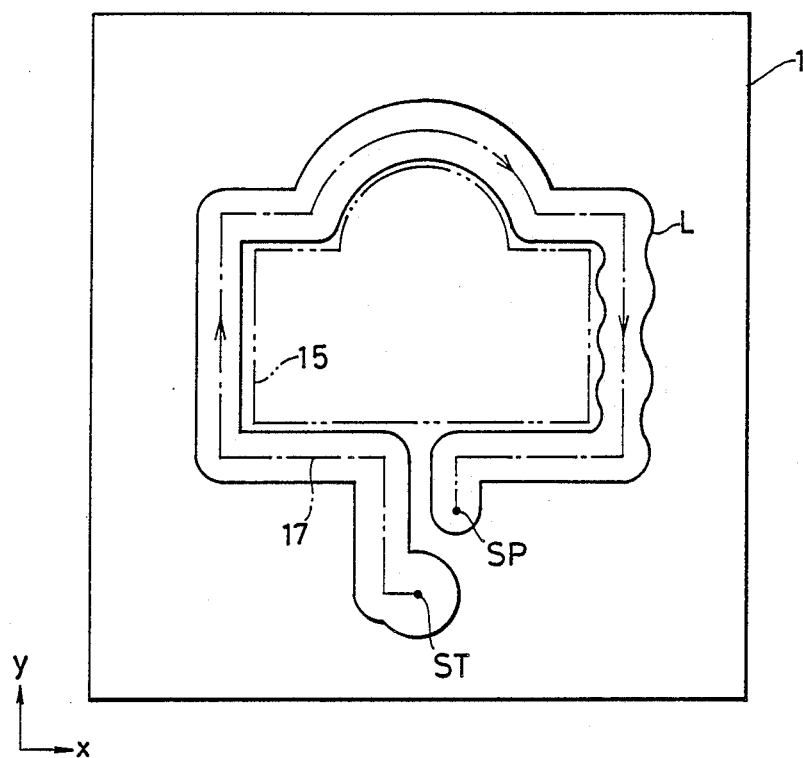
FIG. 3 is an explanatory diagram of the process curve of an actual process.

Now, FIG. 3 is an explanatory diagram of the result of an actual processing, particularly showing an actual curve L for the actual processing, whereas the process curve $L_0$ shown in FIG. 2 is for a hypothetical or an ideal case. As shown in the diagram of FIG. 3, in the actual process errors are produced along the process curve L with respect to the ideal curve $L_0$ shown in FIG. 2. The process error is influenced by the actual process conditions, such as fluctuations in the process power source, chips produced during processing, vibrations in the wire electrode, and the like. Accordingly, in this embodiment, a process precision detection device is attached to the control system and such errors are detected.

The process precision detection device comprises a measurement voltage application circuit 27 which is connected in parallel with a processing power circuit, and a voltage detection circuit 29 to which is connected a measurement control section 31, a measurement point setting section 33, and a process error recognition section 35. In addition, in the present embodiment in order to feed back the recognized process error and improve the finishing precision of the product, a compensation value setting section 37 is connected between the process error recognition section 35 and the process condition setting section 21.

The measurement voltage application section 27 includes a series circuit having a switching transistor $Tr_2$, a resistance $R_2$, and a DC power source $E_2$ which produces a very small direct current voltage, for example 1.5 V, and which is capable of turning the transistor $Tr_2$ ON and OFF by means of the switching circuit 39.

The voltage detection circuit 29 has the configuration of a conventional voltage detection circuit. It detects the gap voltage between the workpiece 1 and the wire electrode 9.

The measurement control section 31 will give instructions for a prescribed measurement operation to the pulse distributor 3 after the completion of the rough or finishing processing, with a prescribed sequence that will be described later. Also, it will receive a measured voltage V from the voltage detection circuit 29 which acts as an interface, and will output the detected result to the process error recognition section 35.

The measurement point setting section 33 will set a measurement point as a sample position for detecting process errors along the measurement path. Here, the measurement path will be set identical to or parallel with the process path. This makes it possible to easily calculate the setting for the path.

The process error recognition section 35 recognizes differences at the measurement points between the ideal process curve $L_0$ and the actual process curve L, based on the signals from the measurement control section 31.

A compensation value setting section 37 sets the compensation value for the next finishing process, i.e., the correcting process which precedes the finishing process or the refinishing process after the finishing process, based on the signals from the process error recognition section 35.

Figure 4:
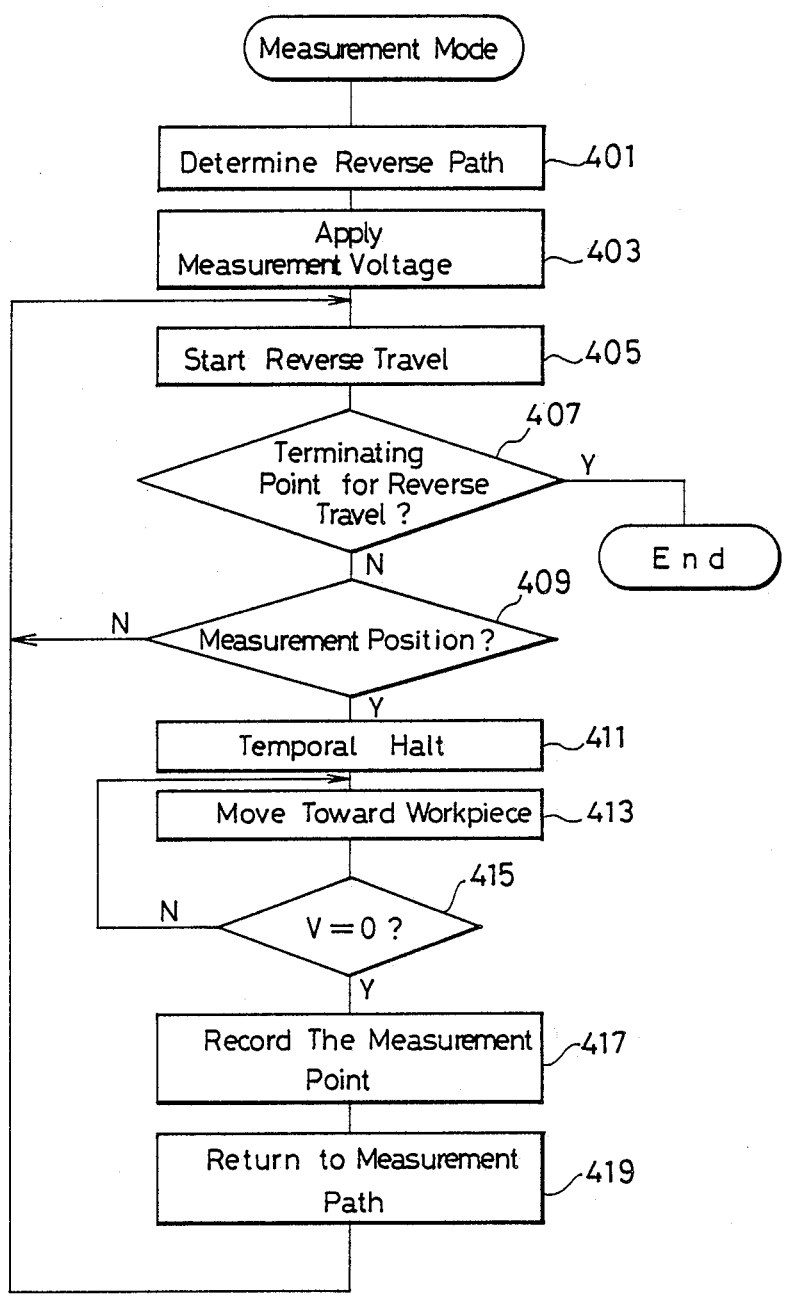
FIG. 4 is a flowchart showing an example of a process precision detection method.
Figure 5:
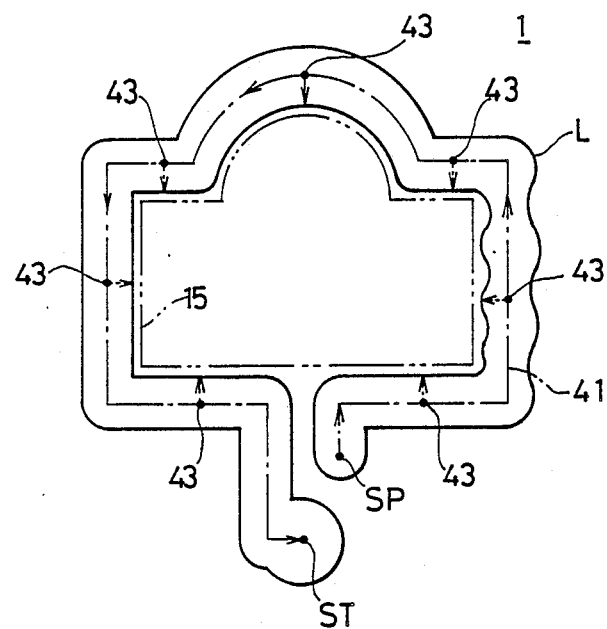
FIG. 5 is an explanatory diagram of an example of setting a measurement path for the method of FIG. 4.

FIG. 4 is a flowchart showing the process precision detection method, and FIG. 5 is an explanatory diagram of an example of setting a measurement path by this method.

In this example, the measurement path is determined as a reverse path 41 of the process path 17, an intermediate point of each line segment is chosen as the measurement point, and at each measurement point the prescribed measuring action is performed.

According to the measurement, the travel of the wire electrode 9 is halted, and the wire electrode is made straight between the rollers 7U and 7D to correctly measure the process error. The supply of a process liquid is stopped so as not to vibrate the wire electrode 9.

Now at step 401, as shown in FIG. 5, the reverse path 41 is determined based on the process path 17.

At step 403 a switching circuit is activated and a measurement voltage $V_0$ is applied between the wire electrode 9 and the workpiece 1.

At step 405 the terminating position SP shown in FIG. 5 is made the starting point and reverse travel is started.

At step 407, a decision is made as to whether this is the terminating point for the reverse travel or not (specifically, in this example, the processing starting-position ST), and, if so, the measurement operation is ended. If it is not the terminating point, the program proceeds to step 409.

At step 409 a decision is made as to whether the present point is a measurement point 43 or not, and if it is the measurement point 43 the program proceeds to step 411.

At step 411 a temporary halt is made and the program proceeds to step 413.

At step 413 the wire electrode 9 moves at slow speed toward the workpiece (product) 1 along a line perpendicular to the advancing direction, according to a program stored in the measurement control section 31.

At step 415 a decision is made to determine if a voltage V detected through the voltage detection circuit 31 becomes zero, i.e. the wire electrode 9 and the workpiece 1 are in contact.

At step 417, the measurement point is output to the process error recognition section 35 to be recorded therein.

At step 419, the wire electrode returns to the measurement path 41 and moves to step 405, and then proceeds to the next measurement point.

After completion of these steps, the process error recognition section 35 recognizes deviations of the actual process curve L from the ideal process curve $L_0$ shown in FIG. 2, at measurement points 43.

A compensation value setting section 37 sets the compensation value for the next finishing process, the correcting process which precedes finishing process, or the refinishing process after the finishing process, based on the signals from the process error recognition section 35. Here, the data to be compensated may be the discharge energy in the next process, the processing velocity, the offset value of the wire electrode 9 for the workpiece (product), and the like. These compensating values are values given to the data for the section of the line segment in which the deviation occurred, so that compensation data are not necessarily provided in segmental units, and may be provided only for the section of line segment at which the error was produced. Further, if it is discovered that a very large cavity has been created in the product 15 from a voltage abnormality after rough processing, the process can be terminated before finishing is carried out, and a judgement of "unsatisfactory" can be made at this time to prevent any wasted processing.

In the above example, a single measurement point 43 is set at the midpoint of each line segment. However, the measurement point 43 may be located at a corner or between a corner and the midpoint.

In addition, the spacing may be measured between the wire electrode 9 and the processed edge of the workpiece 1 opposite to the product 15.

Figure 6:
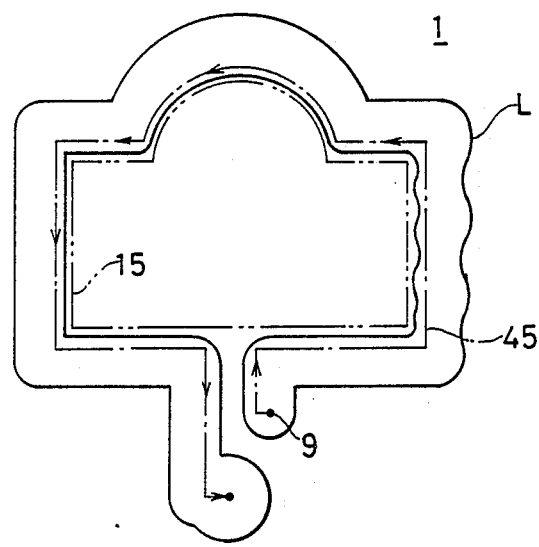
FIG. 6 is an explanatory diagram of an example of setting a measurement path for another process precision detection method of the present invention.

FIG. 6 is an explanatory diagram of an example of the measurement path for another process precision detection method.

In this example, the measurement path 45 is set close to the product 15 side, and detection is made to determine whether or not the wire electrode 9 is in contact with the product 15 on the measurement path. In this embodiment, a plurality of measurement paths 45 (for example, 3) may be set in parallel with small spacings therebetween. The contact status of the wire electrode 9 and the product 15 may then be observed in sequence from the outer track to the inner track, or in the round trip from the inner track back to the inner track, more accurately to detect machining error.

In the foregoing embodiment, the distance from the wire electrode 9 to the product 15 is detected by moving the electrode 9 toward the product 15 and perceiving the contact between the wire electrode 9 and the product 15; however, in the case where it is possible to fill process liquid between the wire electrode 9 and the workpiece 1, the distance from the wire electrode 9 to the product 15 may be detected by the resistance change between the wire electrode 9 and the workpiece 1.

As outlined above, by means of the present invention, a process precision detection device is provided in the wire-cutting electric discharge machining device, causing the wire electrode to move parallel to the product and making it possible to detect process precision from rough to finished processing. This makes it possible to inspect the process quickly and easily without removing the workpiece from the processing table.

Although the preferred embodiments are specifically illustrated and described herein, it should be understood that many modifications and variations of the present invention are possible in light of the above teachings and within the purview of the appended claims without departing from the spirit and intended scope of the invention.

What is claimed is:

1. A wire-cutting electric discharge machining device for forming a product from a workpiece, comprising:
    means for applying an electrical signal voltage between a wire electrode and said workpiece;
    means for determining a measurement path;
    means for moving said wire electrode along the measurement path after completion of a machining process, the measurement path being set substantially along a processed edge of the workpiece;
    means for determining a measurement location on the measurement path;
    means for detecting the signal voltage between the wire electrode and the workpiece and for providing an output signal when detecting change in the signal voltage;
    means for detecting the spacing between the measurement path and the processed edge of the product at the measurement location by moving the wire electrode from a position on the measurement path to the processed edge of the product while sensing the signal from the voltage detecting means; and
    error detection means for detecting machining errors in the previous machining processing, based on the detected spacing between the measurement path and the workpiece, wherein the result detected by the error detection means is used as data for controlling one of (1) a processing velocity and (2) the offset value of the location of the wire electrode with respect to a shape of a product to be formed in the workpiece for the machining process.

2. The wire-cutting electric discharge machining device of claim 1 wherein the electric signal voltage is a small direct current voltage connected in series with a resistor.

3. The wire-cutting electric discharge machining device of claim 1 wherein the measurement path is set parallel to the process path.

4. A wire-cutting electric discharge machining device for forming a product from a workpiece, comprising:
    means for applying an electrical signal voltage between a wire electrode and said workpiece;
    means for determining a measurement path;
    means for moving said wire electrode along the measurement path after completion of a machining process, the measurement path being set substantially along a processed edge of the workpiece;
    means for determining a measurement location on the measurement path;
    means for detecting the signal voltage between the wire electrode and the workpiece and for providing an output signal when detecting change in the signal voltage;
    means for detecting the spacing between the measurement path and the processed edge of the product at the measurement location by moving the wire electrode from a position on the measurement path to the processed edge of the product while sensing the signal from the voltage detecting means; and error detection means for detecting machining errors in the previous machining processing, based on the detected spacing between the measurement path and the workpiece, wherein the result detected by the error detection means is used as data for controlling the discharge energy applied to a discharge gap for the machining process.

5. A method of processing a workpiece by means of a wire-cutting electric discharge machining device, comprising the steps of:

inspecting the wire-cut electric discharge machining process precision after the completion of a machining step of a workpiece edge in a first machining process along a process path, the inspection process further comprising the steps of:

(a) determining a reverse path on a workpiece on which the process is performed, the reverse path being one which reverses the process path;

(b) applying a measurement voltage between a wire electrode and the workpiece;

(c) commencing reverse travel of the wire electrode along the reverse path from a terminating position of the process path;

(d) stopping temporarily the reverse travel of the wire electrode at a measurement location;

(e) moving the wire electrode in a direction perpendicular to the reverse path;

(f) detecting the voltage between the wire electrode and the workpiece;

(g) providing a signal when the voltage between the electrode and the workpiece becomes zero; and (h) calculating the spacing between the processed edge of the workpiece and the reverse path based on the movement distance of the wire electrode in the direction perpendicular to the reverse path; and performing a second machining process on the workpiece along the process path, wherein the result detected by the inspection step is used as data for controlling the second machining process.

6. The method of claim 5 wherein the result detected by the error detection means is used as data for controlling a processing velocity for the machining process.

7. The method of claim 5 wherein the result detected by the error detection means is used as data for controlling the discharge energy applied to a discharge gap for the machining process.

8. The method of claim 5 wherein the result detected by the error detection means is used as data for controlling the offset value of the location of the wire electrode with respect to a shape of a product to be formed in the workpiece for the machining process.

9. An inspection device for inspecting the machining precision after the completion of a machining process along a forward cutting path applied to a workpiece in a wire-cutting electric discharge machining device, comprising:

(a) means for tracing a measurement path on the workpiece;

(b) a wire electrode;

(c) means for applying a measurement voltage between the wire electrode and the workpiece;

(d) means for moving the wire electrode along the measurement path;

(e) means for moving the wire electrode normal to the measurement path;

(f) means for determining the distance the wire electrode moves between the measurement path and the workpiece;

(g) means for sensing the voltage between the wire electrode and the machined surface;

(h) means for generating a signal when the voltage between the electrode and the machined surface becomes zero, and for providing said signal as an output; and (i) means for calculating the spacing between the workpiece machined surface and the cutting path based on the signal output at step (h) wherein spacing data from the calculating means is used for controlling one of (1) a processing velocity and (2) the offset value of the location of the wire electrode with respect to a shape or a product to be formed in the workpiece for the next machining process.

10. The inspection device of claim 9, said means for applying a measurement voltage between the wire electrode and the workpiece comprising:

a switching transistor, a resistance, a d.c. power source, and a switching circuit adapted to turn the switching transistor ON and OFF.

11. The inspection device of claim 9, wherein said measurement path is parallel to the forward cutting path.

12. An inspection device for inspecting the machining precision after the completion of a machining process along a forward cutting path applied to a workpiece in a wire-cutting electric discharge machining device, comprising:

(a) means for tracing a measurement path on the workpiece;

(b) a wire electrode;

(c) means for applying a measurement voltage between the wire electrode and the workpiece;

(d) means for moving the wire electrode along the measurement path;

(e) means for moving the wire electrode normal to the measurement path;

(f) means for determining the distance the wire electrode moves between the measurement path and the workpiece;

(g) means for sensing the voltage between the wire electrode and the machined surface;

(h) means for generating a signal when the voltage between the electrode and the machined surface becomes zero, and for providing said signal as an output; and (i) means for calculating the spacing between the workpiece machined surface and the cutting path based on the signal output at step (h) wherein spacing data from the calculating means is used for controlling the discharge energy applied to a discharge gap for the next machining process.

13. A wire-cutting electric discharge machining device having a device for inspecting the precision of a machining process, after the completion of the process along a process path, the inspecting device comprising:

(a) means for determining a reverse path on the workpiece installed on a worktable, on which the machining process is performed, the reverse path being one which reverses the process path;

(b) a wire electrode;

(c) means for applying a measurement voltage between the wire electrode and the workpiece;

(d) means for commencing reverse travel of the wire electrode along the reverse path from a terminating position of the process path;
(e) means for stopping temporarily the reverse travel of the wire electrode at a measurement point;
(f) means for moving the wire electrode in a direction perpendicular to the reverse path;
(g) means for detecting the voltage between the wire electrode and the workpiece;
(h) means for outputting a signal when the voltage between the electrode and the workpiece becomes zero; and
(i) means for calculating the spacing between the processed edge of the workpiece and the reverse path based on the signal output wherein spacing data from the calculating means is used for controlling one of (1) a processing velocity and (2) the offset value of the location of the wire electrode with respect to a shape of a product to be formed in the workpiece for the next machining process.

14. The inspection device of claim 13, said means for applying a measurement voltage between the wire electrode and the workpiece comprising:
a switching transistor, a resistance, a d.c. power source, and a switching circuit adapted to turn the switching transistor ON and OFF.

15. The inspection device of claim 13, wherein said measurement path is parallel to the forward cutting path.

16. A wire-cutting electric discharge machining device having a device for inspecting the precision of a machining process, after the completion of the process along a process path, the inspecting device comprising:
(a) means for determining a reverse path on the workpiece installed on a worktable, on which the machining process is performed, the reverse path being one which reverses the process path;
(b) a wire electrode;
(c) means for applying a measurement voltage between the wire electrode and the workpiece;
(d) means for commencing reverse travel of the wire electrode along the reverse path from a terminating position of the process path;
(e) means for stopping temporarily the reverse travel of the wire electrode at a measurement point;
(f) means for moving the wire electrode in a direction perpendicular to the reverse path;
(g) means for detecting the voltage between the wire electrode and the workpiece;
(h) means for outputting a signal when the voltage between the electrode and the workpiece becomes zero; and
(i) means for calculating the spacing between the processed edge of the workpiece and the reverse path based on the signal output wherein spacing data from the calculating means is used for controlling the discharge energy applied to a discharge gap for the next machining process.

* * * * *